United States Patent
Li

(10) Patent No.: US 7,362,216 B2
(45) Date of Patent: Apr. 22, 2008

(54) REVERSING SENSOR WITHOUT A CONTROL BOX

(76) Inventor: Shih-Hsiung Li, 8F-1, No. 23, Sec. 1, Hangchow S. Rd., Taipei (TW)

( * ) Notice: Subject to any disclaimer, the term of this patent is extended or adjusted under 35 U.S.C. 154(b) by 188 days.

(21) Appl. No.: 11/282,199

(22) Filed: Nov. 17, 2005

(65) Prior Publication Data

US 2007/0109109 A1    May 17, 2007

(51) Int. Cl.
*B60Q 1/00* (2006.01)
(52) U.S. Cl. ............ 340/435; 340/436; 340/431; 340/456; 340/463; 340/903; 340/932.2
(58) Field of Classification Search ........ 340/435, 340/436, 431, 456, 463, 903, 932.2
See application file for complete search history.

(56) References Cited

U.S. PATENT DOCUMENTS

| | | | |
|---|---|---|---|
| 4,500,977 A | 2/1985 | Gelhard | |
| 5,574,426 A * | 11/1996 | Shisgal et al. | 340/435 |
| 5,936,520 A | 8/1999 | Luitje et al. | |
| 6,380,833 B1 | 4/2002 | Nguyen et al. | |
| 6,777,825 B1 | 8/2004 | Swart et al. | |
| 6,864,783 B2 * | 3/2005 | Rao et al. | 340/435 |
| 2003/0034883 A1 | 2/2003 | Sato et al. | |
| 2003/0222773 A1 | 12/2003 | Li | |
| 2004/0243323 A1 | 12/2004 | Kuenzler et al. | |

FOREIGN PATENT DOCUMENTS

| | | |
|---|---|---|
| DE | 10236879 A1 | 8/2002 |
| GB | 2392979 A | 3/2004 |
| JP | 6-88871 A | 3/1994 |

* cited by examiner

*Primary Examiner*—Tai Nguyen
(74) *Attorney, Agent, or Firm*—patenttm.us

(57) ABSTRACT

A reversing sensor device applies a master-slave type of sensor architecture. The reversing sensor device includes at least one master-sensor and more than one slave-sensor. The master-sensor includes a microprocessor, an ultrasonic emission circuit, a reflective wave detection circuit and an alarm circuit. The master-sensor not only takes charge of detecting the obstacle but can also coordinate the operation timing for each of the slave-sensors. In this way, the master-sensor replaces the functionality of a conventional control box. The master-sensor is connected to the slave-sensors and also uses a time-sharing principle and a polling method to control the timing of each slave-sensor to collect a detection result. In addition, the slave-sensor includes a microprocessor, an ultrasonic emission circuit and a reflective wave detection circuit.

15 Claims, 10 Drawing Sheets

REVERSING SENSOR WITHOUT A CONTROL BOX

BACKGROUND OF THE INVENTION

1. Field of the Invention

The invention relates in general to a reversing sensor without a control box, and more particularly a master-slave type of sensor architecture to form a reversing sensor for a vehicle, wherein a master-sensor not only can take charge of detecting an obstacle but also can coordinate an operation timing for each slave-sensor and collect a detection result of the slave sensors.

2. Description of the Related Art

Among quickly developing technology, reversing sensors for automobiles are becoming widely used to assist drivers in backing up a vehicle safely. The sensitivity of a reversing sensor is directly related to a configuration setting and the number of sensors used.

With reference to FIG. 4, a conventional reversing sensor having multiple sensors includes a control box 80 connected to multiple ultrasonic sensors 81~84. Each of the multiple ultrasonic sensors 81~84 is connected to the control box 80 via a cable. The control box 80 coordinates the sensors to detect an obstacle.

Moreover, the connection cable between the ultrasonic sensors 81~84 and the control box 80 includes at least a power signal line and a two-way data transmission line. Thereby each of the ultrasonic sensors 81~84 has to be connected with the control box 80 via a 4-pin cable. When using the aforesaid connection method, the control box 80 is installed inside a vehicle and the ultrasonic sensors 81~84 are installed on a rear bumper. Under such conditions, a cable length between the control box 80 and the ultrasonic sensors 81~84 usually cannot be shorter than 2.5 meters. Therefore line material cost is rather high and also the long data line is likely to be affected by interference.

On the other hand, there is also a problem when testing parts of a vehicle and assembling the vehicle. Since the ultrasonic sensors 81~84 are installed on the rear bumper whereas the control box 80 is installed inside the vehicle, the function of the reversing sensor cannot be tested before the rear bumper is attached to the vehicle. Hence it is rather inconvenient for installation and testing operations, so as to reduce production efficiency.

SUMMARY OF THE INVENTION

The present invention provides a reversing sensor without a control box for a vehicle, which applies a master-slave type of sensor architecture. With the reversing sensor without the control box of the present invention, the control box of a reversing device can be eliminated and the device can also be tested for problems before assembling. Furthermore, with the present invention, line material costs can be reduced.

In order to achieve the above-mentioned objectives, the reversing sensor device for a vehicle of the present invention includes at least one master-sensor and more than one slave-sensor. The master-sensor includes a microprocessor, an ultrasonic emission circuit, a reflective wave detection circuit and an alarm circuit. The master-sensor not only takes charge of detecting the obstacle but can also coordinate the operation timing for each of the slave-sensors. In this way, the master-sensor replaces the functionality of a conventional control box. The master-sensor is connected to the slave-sensors and also uses a time-sharing principle and a polling method to control the timing of each slave-sensor to collect a detection result. In addition, the slave-sensor includes a microprocessor, an ultrasonic emission circuit and a reflective wave detection circuit. Since the master-sensor and the slave-sensors are installed on a vehicle's rear bumper, when a vehicle is assembled in a factory, the reversing sensor can be easily tested on the bumper without having to attach the rear bumper to the vehicle. Hence testing procedures can be further improved.

DETAILED DESCRIPTION OF THE INVENTION

Figure 1A:
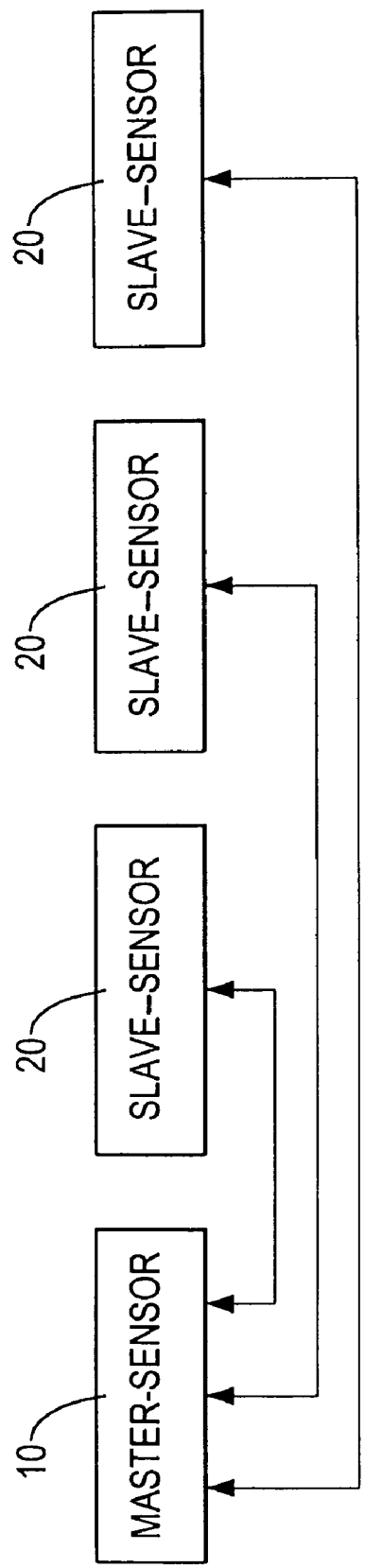
FIG. 1A shows a system block diagram of a first embodiment of the present invention.
Figure 1B:
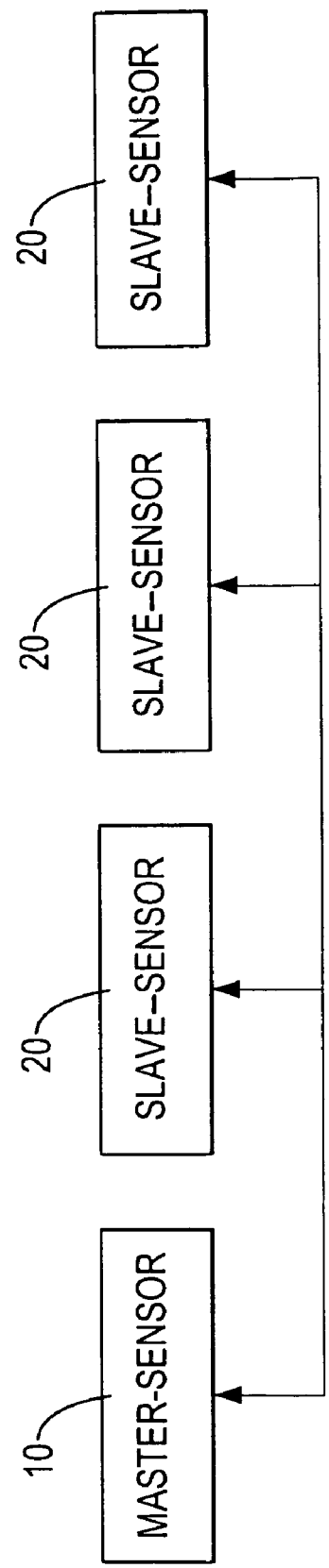
FIG. 1B shows a system block diagram of a second embodiment of the present invention.
Figure 2A:
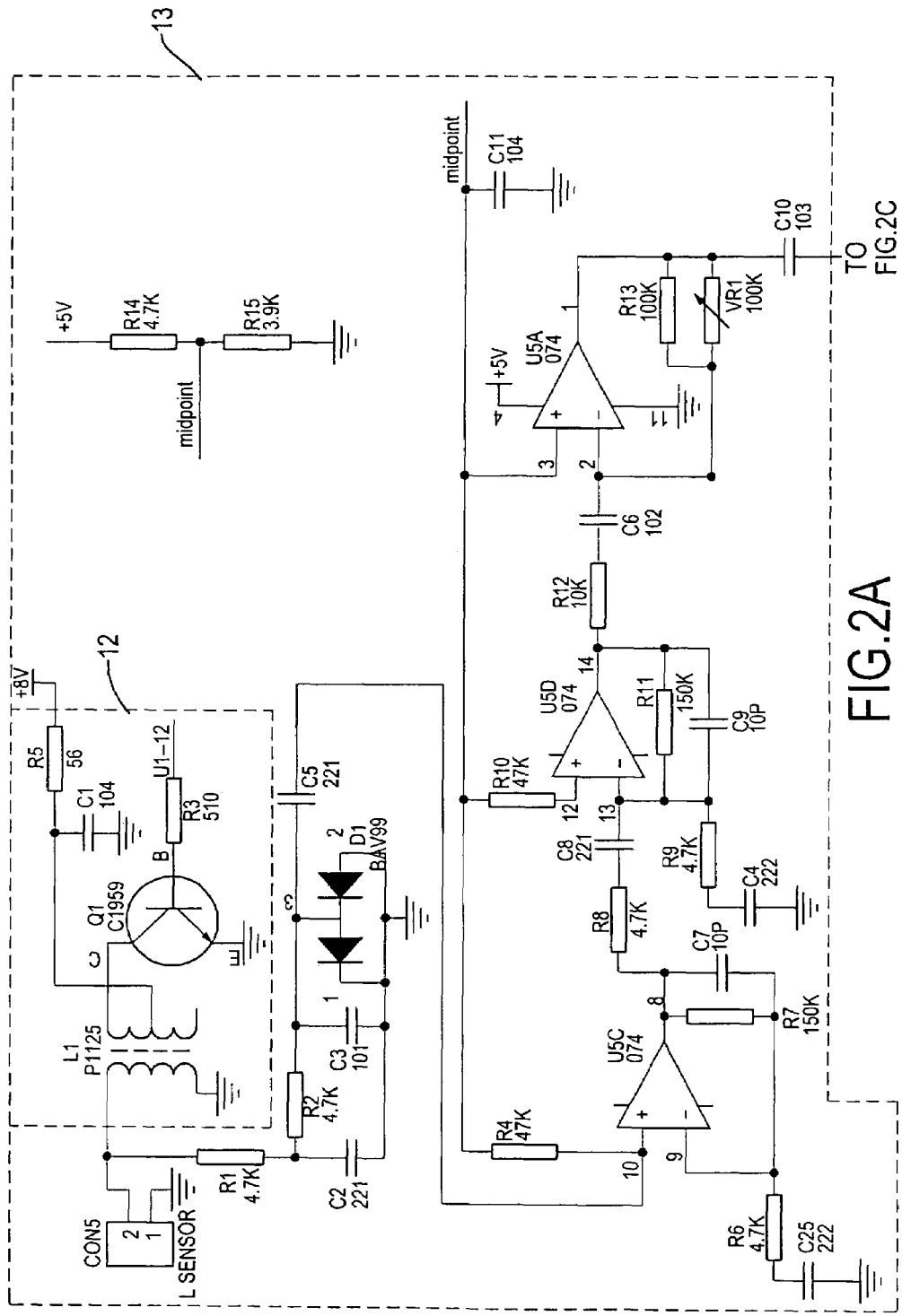
FIGS. 2A-2D show a detailed circuit diagram of a master-sensor of the present invention.
Figure 2B:
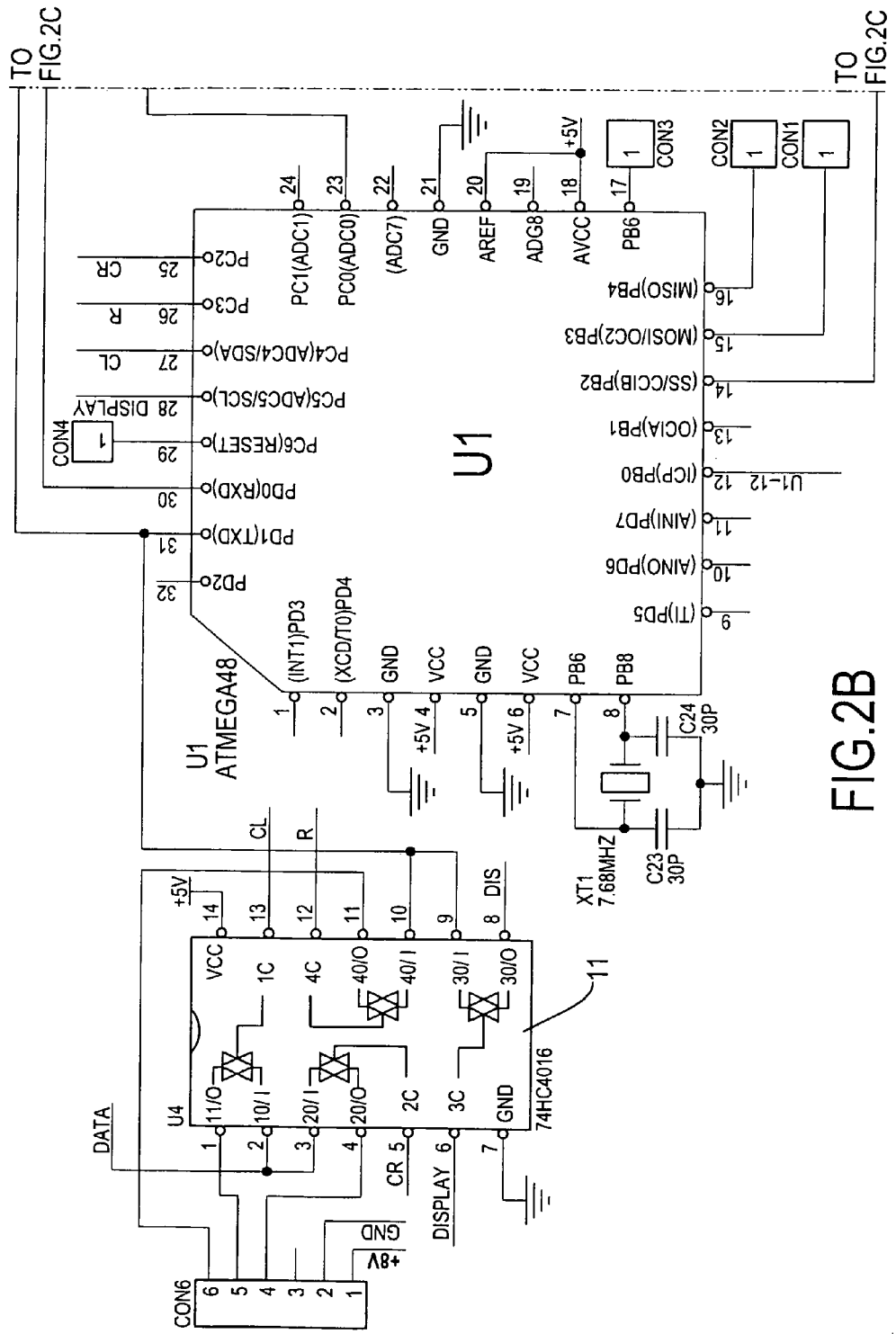
Figure 2C:
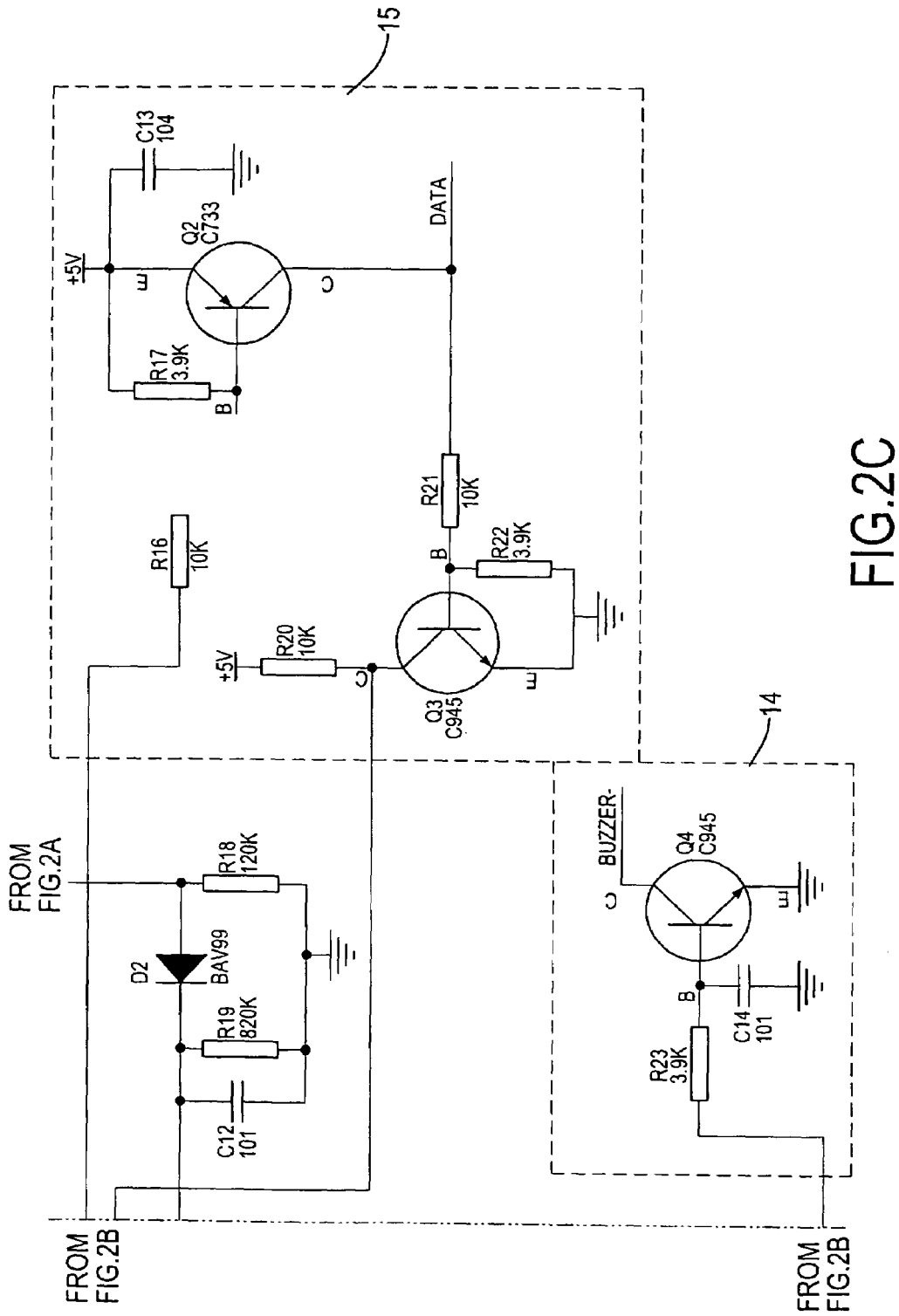
Figure 2D:
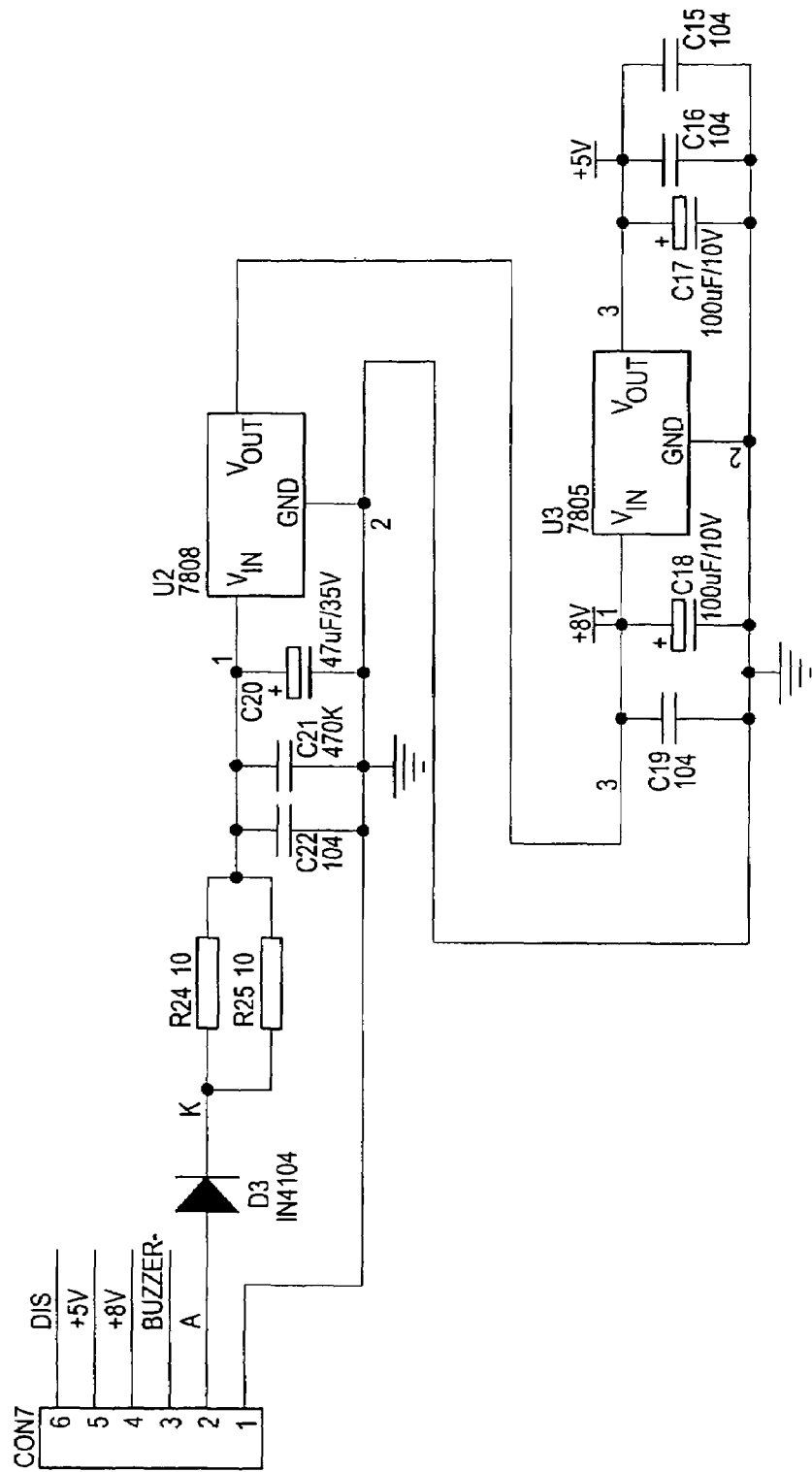

With reference to either FIGS. 1A or 1B, a system block diagram of the present invention mainly comprises a master-sensor 10 and multiple slave-sensors 20. Each slave-sensor 20 is respectively connected to the master-sensor 10 via an independent line and also communicates with the master-sensor 10. Moreover, the slave-sensors 20 can also be mutually connected to the master-sensor 10 via a single communication line. No matter how the master sensor 10 is connected to the slave-sensors 20, the master-sensor 10 uses a polling method to control the timing of each slave-sensor 20 to collect a detection result. Each slave-sensor 20 sends detection data to the master-sensor 10 only when the slave-sensor 20 receives a polling instruction from the master-sensor.

A detailed circuit diagram of a practicable example of a preferred embodiment of the master-sensor 10 is shown in FIGS. 2A-2D. The master-sensor 10 includes a microprocessor U1, an ultrasonic emission circuit 12, a reflective wave detection circuit 13 and an alarm circuit 14.

The microprocessor U1 is used as a control center, which takes charge of generating a 40 KHz square wave, collecting the detection result of the slave-sensors 20, communicating with the slave-sensors 20 via a gate circuit 74HC4016, calculating a distance from the obstacle to the vehicle and starting an alarm. In this preferred embodiment, the microprocessor U1 is an ATMEGA8 chip produced by the ATMEL company. Furthermore, the microprocessor U1 includes a built-in A/D (analog/digital) converter.

The ultrasonic emission circuit 12 includes a transistor Q1 and a step-up coil L1. A base of the transistor Q1 is connected to a square wave output pin 12 of the microprocessor U1, so as to step up a 40 KHz square wave signal that is outputted by the microprocessor U1. Then an ultrasonic transceiver (not shown in the diagram) made of a piezoelectric ceramic transmits an ultrasonic wave.

The reflective wave detection circuit 13 includes a plurality of resistors R1, R2, a capacitor C5 and an amplifier circuit having a plurality of operation amplifiers U5C, U5D and U5A. After the ultrasonic emission circuit 12 transmits the ultrasonic wave via the piezoelectric ceramic, a part of an ultrasonic signal will be reflected to the piezoelectric ceramic if the ultrasonic wave encounters an obstacle in a transmission process. The piezoelectric ceramic transforms the reflected signal into a weak communication signal. The weak communication signal is then amplified by the amplifier circuit via the resistors R1, R2 and the capacitor C5. The amplifier circuit sends the amplified communication signal to an analog input terminal ADC0 of the microprocessor U1. Since the microprocessor U1 has the built-in 12 bit A/D converter, the amplified analog communication signal can be converted into a digital signal. Then a distance from the obstacle to the sensor can be calculated in accordance with a signal range and a time difference between the time to transmit the ultrasonic wave and the time to receive the reflected wave.

The alarm circuit 14 includes a transistor Q4 connected to a buzzer. The alarm circuit 14 is connected to a control pin 14 of the microprocessor U1. The microprocessor U1 determines whether to start the alarm or not in accordance with the detection result of the master-sensor 10 or other slave-sensors 20. When the microprocessor U1 decides to start the alarm, the microprocessor U1 drives the buzzer via the transistor Q4. When the control pin 14 of the microprocessor U1 outputs different electric potential, the buzzer can generate the alarm at different frequencies.

Further, the master-sensor 10 can also be externally connected to a display. The display is connected to the microprocessor U1 via the gate circuit 11 to display a distance from the obstacle to a rear of the vehicle. Therefore the distance to the obstacle can be clearly displayed to a driver.

In this preferred embodiment, the gate circuit 11 can be comprised of a No. 74HC4016 IC (integrated circuit) having 16 electronic switches for switching a communication target of the microprocessor U1. When the microprocessor U1 needs to communicate with one of the slave-sensors 20, a corresponding electronic switch of the gate circuit 11 is closed, so as to form a connection with the corresponding slave-sensor 20. Moreover, the communication between the master-sensor 10 and the display is also selected by the gate circuit 11 in this preferred embodiment. When the microprocessor U1 needs to communicate with the display, the microprocessor U1 closes the corresponding electronic switch of the gate circuit 1, so that the signal can be sent to the display to be displayed.

In order to further reduce line material cost, transmission/reception data lines between the master-sensor 10 and the slave-sensors 20 can be combined into a single data line. The microprocessor U1 of the master-sensor 10 controls a transmission/reception timing to ensure transmit/receive data does not occur simultaneously.

In order to achieve the aforesaid objective, the master-sensor 10 further includes a communication circuit 15. The communication circuit 15 includes two transistors Q2 and Q3. One transistor Q2 is PNP and the other transistor Q3 is NPN. A collector of the transistor Q2 and a base of the transistor Q3 are mutually connected to a communication line DATA. The communication line DATA is connected to the slave-sensors 20 via the gate circuit 11. A base of the transistor Q2 is connected to a TXD pin of the microprocessor U1, and a collector of the transistor Q3 is connected to a RXD pin of the microprocessor U1. The microprocessor U1 transmits and receives data via the two transistors Q2 and Q3 of the communication circuit 15.

The data transmission between the master-sensor 10 and the slave-sensors 20 is a reverse transmission. For example, a high electric potential is transmitted by a low electric potential. When the communication line DATA is used to transmit data, the TXD pin of the microprocessor U1 is a data free transmission or transmits the high electric potential. At this moment, the transistor Q2 is disconnected and the communication line DATA includes the low electric potential. If the TXD pin of the microprocessor U1 transmits the low electric potential, the transistor Q2 is conductive and the communication line DATA includes the high electric potential. On the contrary, when the communication line DATA is used to receive data, the transistor Q3 is disconnected and the RXD pin of the microprocessor U1 is the high electric potential if the communication line DATA does not receive any data or receives the low electric potential that actually the high electric potential is transmitted. When the communication line DATA includes the high electric potential that a low electric potential is transmitted, the transistor Q3 is conductive and the RXD pin of the microprocessor U1 is detected to be the low electric potential.

Figure 3A:
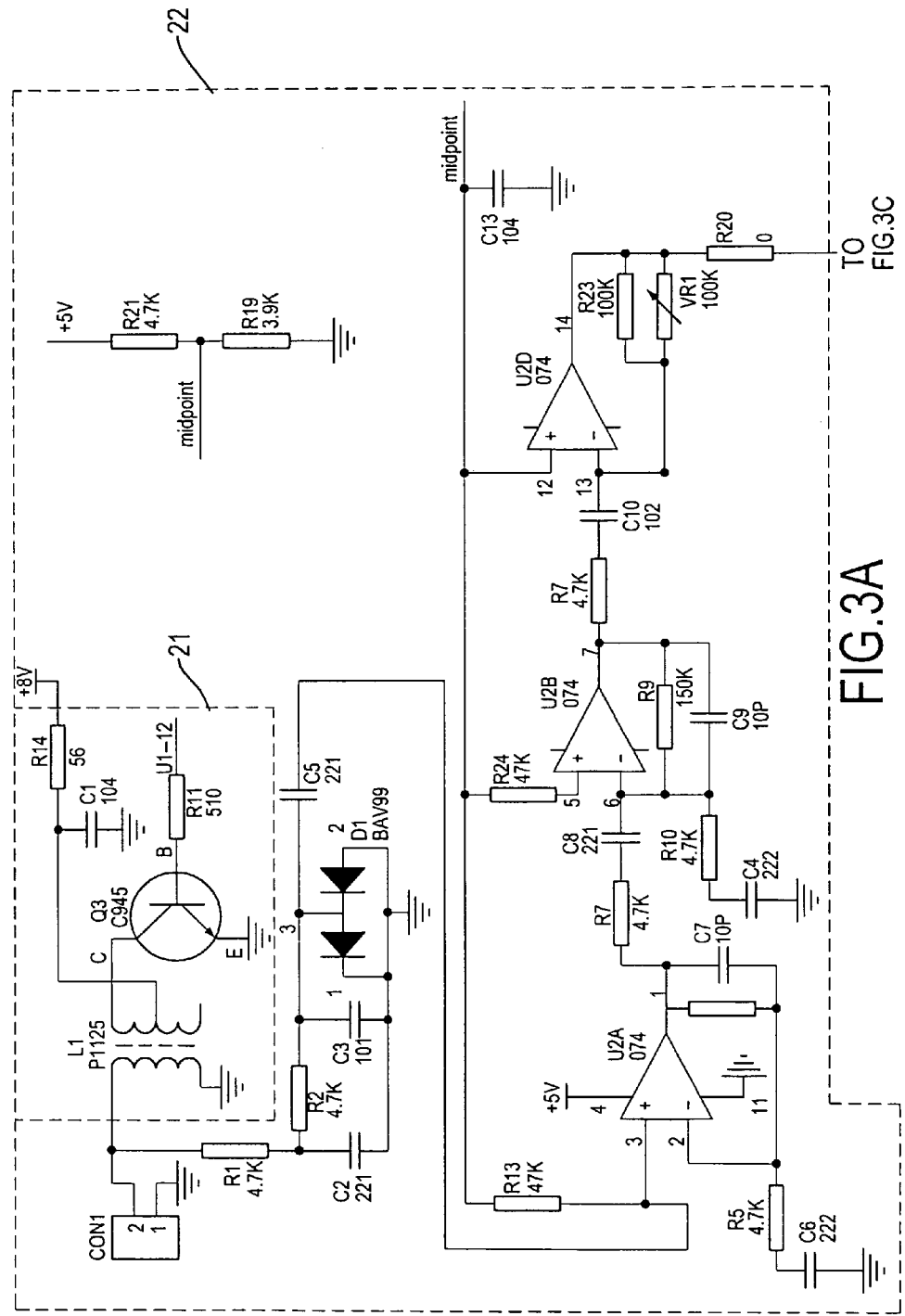
FIGS. 3A-3C show a detailed circuit diagram of a slave-sensor of the present invention.
Figure 3B:
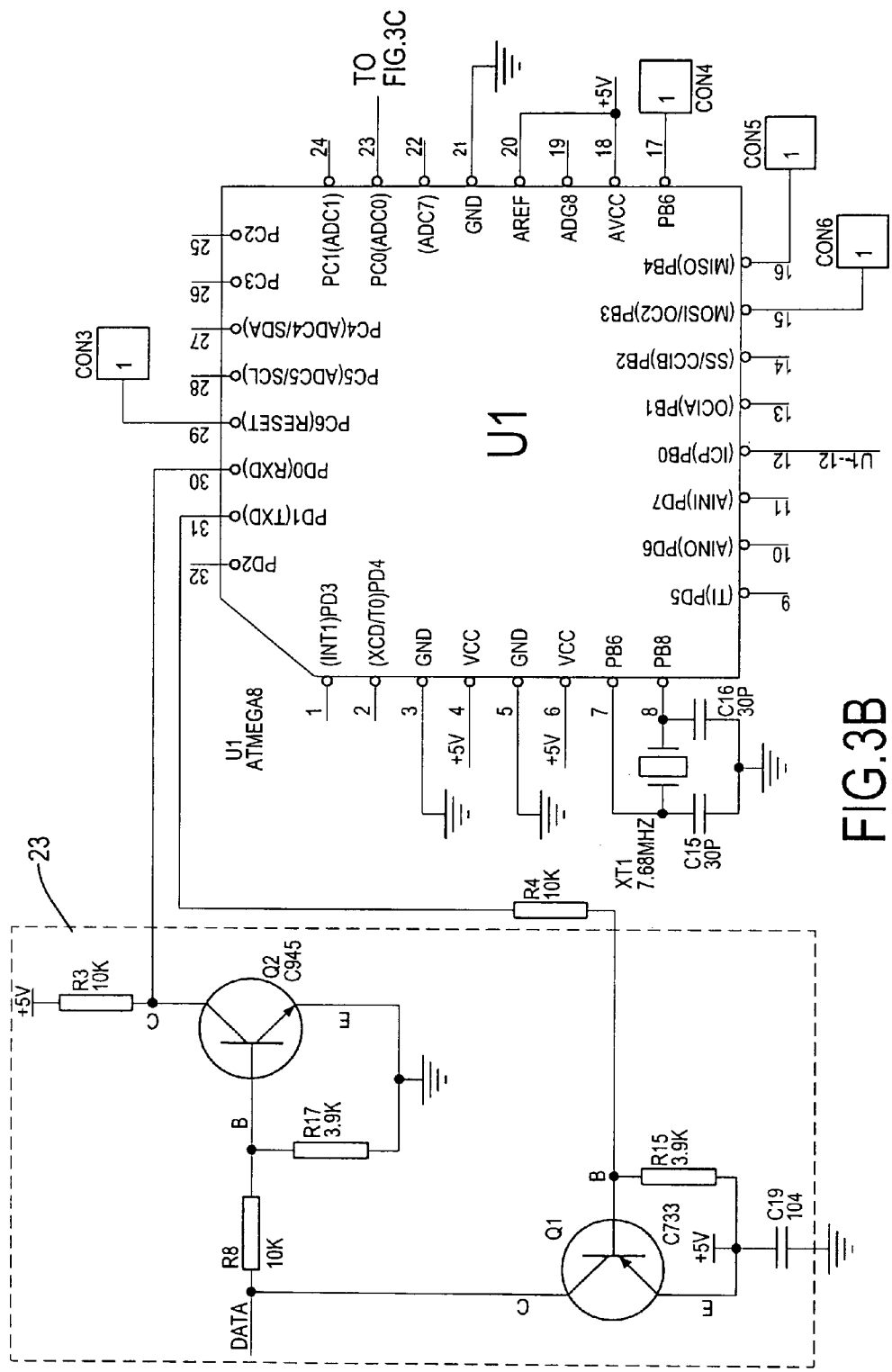
Figure 3C:
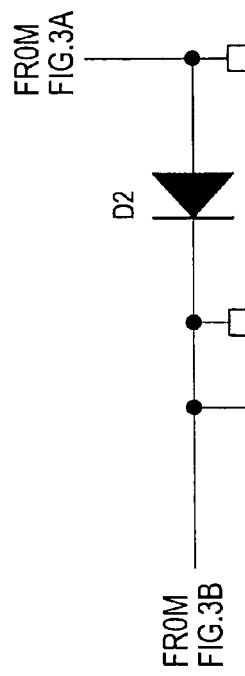
Figure 3C:
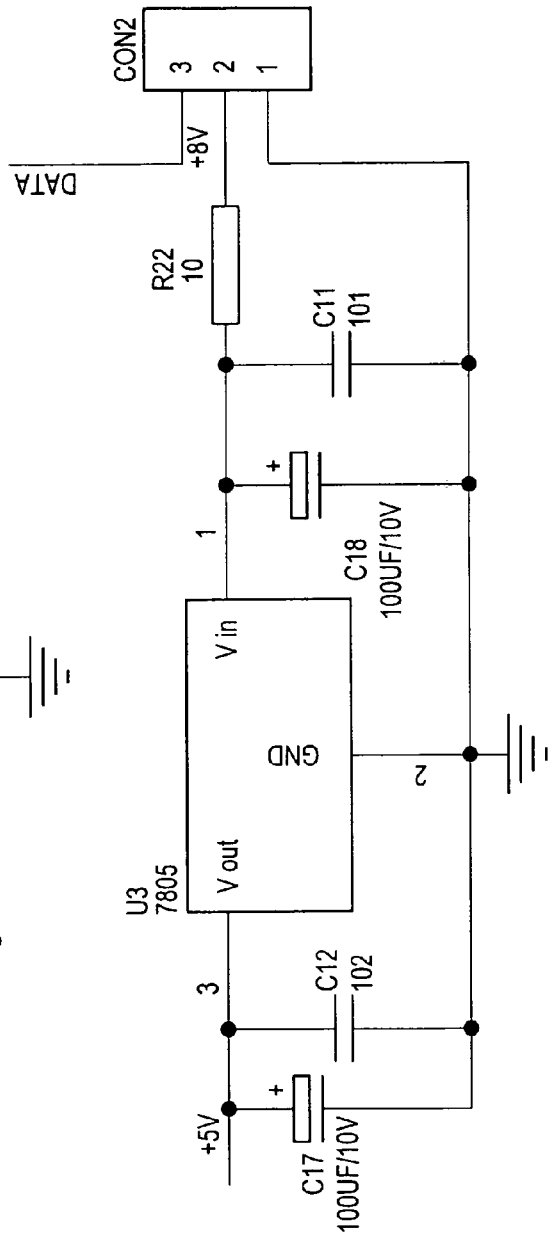
Figure 4:
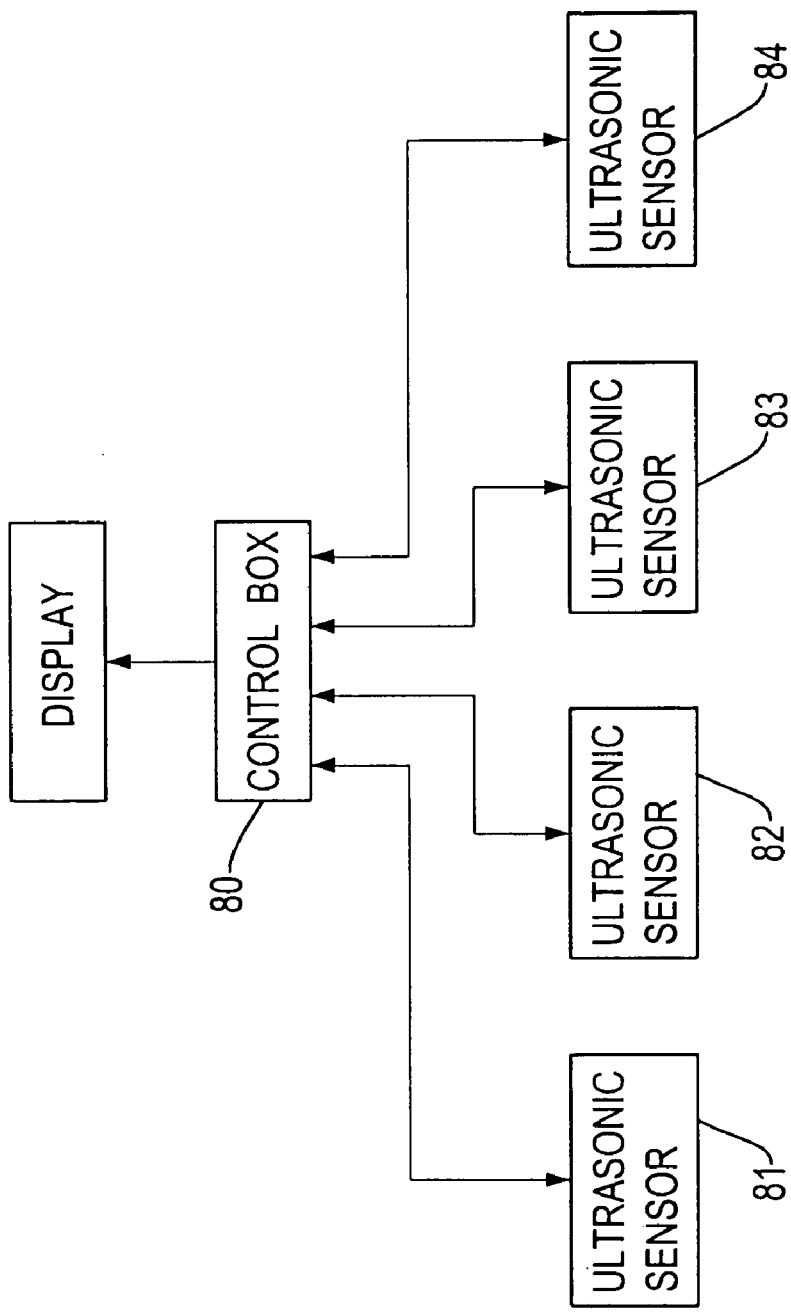
FIG. 4 shows a block diagram of a conventional reversing sensor having multiple sensors.

When the line is idle, the master-sensor 10 and all of the TXD pins of the microprocessors of the slave-sensors 20 are of high potential. At this moment, the communication line DATA is of low potential, hence all of the RXD pins are of high potential. When any one of the microprocessors requires transmitting data, the TXD pin is first set to be the low electric potential as a start bit. At this moment, the communication line DATA becomes the high electric potential and the RXD pins of the other microprocessors will detect the low electric potential of the start bit. Moreover, with reference to FIGS. 3A-3C, the slave-sensor 20 includes a microprocessor U1, an ultrasonic emission circuit 21 and a reflective wave detection circuit 22.

The microprocessor U1 is also an ATMEGA8 chip produced by ATMEL company. The microprocessor U1 works as a control center, which takes charge of generating a 40 KHz square wave and detecting a reflected signal from an obstacle. Furthermore, the microprocessor U1 includes a built-in A/D converter.

The ultrasonic emission circuit 21 includes a transistor Q3 and a step-up coil L1. A base of the transistor Q3 is connected to a square wave output pin 12 of the microprocessor U1, so as to step up a 40 KHz square wave signal that is outputted by the microprocessor U1. Then an ultrasonic transceiver (not shown in the diagram) made of a piezoelectric ceramic transmits an ultrasonic wave.

The reflective wave detection circuit 22 includes a plurality of resistors R1, R2, a capacitor C5 and an amplifier circuit having a plurality of operation amplifiers U2A, U2B and U2C. After the ultrasonic emission circuit 21 transmits the ultrasonic wave via the piezoelectric ceramic, a part of an ultrasonic signal will be reflected to the piezoelectric ceramic if the ultrasonic wave encounters an obstacle in a transmission process. The piezoelectric ceramic transforms the reflected signal into a weak communication signal. Then the weak communication signal is amplified by the amplifier circuit via the resistors R1, R2 and the capacitor C5. The amplifier circuit sends the amplified weak communication signal to an analog input terminal ADC0 of the microprocessor U1. Since the microprocessor U1 has the built-in 12 bit A/D converter, the amplified analog communication signal can be converted into a digital signal. Then a distance from the obstacle to the sensor can be calculated in accordance with a signal range and a time difference between the time to transmit the ultrasonic wave and the time to receive the reflected wave.

In order to further reduce line material cost, transmission/reception data lines between the master-sensor 10 and the slave-sensors 20 can be combined into a single data line. In order to achieve the aforesaid objective, every slave-sensor 20 further includes a communication circuit 23. The communication circuit 23 includes two transistors Q1 and Q2. One transistor Q1 is PNP and the other transistor Q2 is NPN. A collector of the transistor Q1 and a base of the transistor Q2 are mutually connected to a communication line DATA. A base of the transistor Q1 is connected to a TXD pin of the microprocessor U1, and a collector of the transistor Q2 is connected to a RXD pin of the microprocessor U1. The microprocessor U1 transmits and receives data via the two transistors Q1 and Q2 of the communication circuit 23. The data transmission between the master-sensor 10 and the slave-sensors 20 is also a reverse transmission, which applies the same principle as the communication circuit 15 of the master-sensor 10. Herein the detailed principle is not repeated.

It can be understood from the above descriptions that the detailed circuit, an operation principle and a usage method of the present invention at least includes multiple characteristics as follows.

First, the present invention applies a master-slave type of a sensor structure to enable the master-sensor to not only take charge of detecting the obstacle but also to coordinate the operation timing for each of the slave-sensors. In this way, the master-sensor replaces the functionality of a conventional control box. Moreover, the slave-sensors detect the obstacle under the coordination of the master-sensor. Hence the reversing sensor for a vehicle does not include a conventional control box, so as to eliminate the influence of the control box. Second, with the master-slave type of the sensor structure, when the master-sensor is connected to the slave-sensors, the connection cable length of the master-sensor and the slave-sensor can be less than 1.5 meters, while the length of a vehicle's rear bumper is normally 2 meters, so as to reduce the line material cost. Furthermore, transmission interference also can be effectively reduced due to a shortened data line. Third, since the master-sensor and the slave-sensors are installed on a vehicle's rear bumper, when a vehicle is assembled in a factory, the reversing sensor can be easily tested on the rear bumper without having to attach the rear bumper to a vehicle. Hence testing procedures during the assembly of the vehicle can be further improved, so as to enhance production efficiency in the vehicle factory.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A reversing sensor device without a control box for a vehicle, the device comprising at least one master-sensor and more than one multiple slave-sensors; wherein the master-sensor has an obstacle detection function, connects to the slave-sensors, uses a polling technique to coordinate and control the operating timing of each slave-sensor to collect a sensing result and comprises;

a microprocessor for generating a square wave signal, collecting an A/D conversion result, communicating with the slave-sensors, and calculating a distance from the obstacle to the vehicle;

an ultrasonic emission circuit being connected to the microprocessor to boost voltage potential of the square wave signal and then driving an ultrasonic transceiver to transmit an ultrasonic wave;

a reflective wave detection circuit being connected to the ultrasonic transceiver and connected to the microprocessor, wherein when the transmitted ultrasonic wave encounters an obstacle and then is reflected to the ultrasonic transceiver, the reflective wave detection circuit detects and amplifies a reflective signal and then sends the amplified reflective signal to the microprocessor;

a gate circuit connected to the microprocessor and the slave-sensors and controlled by the microprocessor to select one slave-sensor communicating with the microprocessor;

an alarm circuit connected to the microprocessor and outputting a warning signal based on a control of the microprocessor in accordance with the sensing result of the master-sensor or the slave-sensors.

2. The reversing sensor device as claimed in claim 1, wherein the master-sensor further comprises a communication circuit being connected to the gate circuit to make the master-sensor connect to the slave-sensors via a single communication line.

3. The reversing sensor device as claimed in claim 2, wherein the microprocessor has a built-in A/D converter.

4. The reversing sensor device as claimed in claim 2, wherein the ultrasonic emission circuit comprises a transistor and a step-up coil, wherein a base of the transistor is connected to a square wave output pin of the microprocessor, so as to step up the square wave signal outputted by the microprocessor.

5. The reversing sensor device as claimed in claim 2, wherein the reflective wave detection circuit comprises a resistor, a capacitor and an amplifier circuit having a plurality of operation amplifiers, wherein an input terminal of the reflective wave detection circuit is connected to the ultrasonic transceiver and an output terminal of the reflective wave detection circuit is connected to the microprocessor.

6. The reversing sensor device as claimed in claim 2, wherein the communication circuit comprises two transistors Q2 and Q3, wherein one transistor Q2 is PNP and the other transistor Q3 is NPN, wherein a collector of the transistor Q2 and a base of the transistor Q3 are mutually connected to a communication line, and wherein a base of the transistor Q2 is connected to a TXD pin of the microprocessor, and a collector of the transistor Q3 is connected to a RXD pin of the microprocessor.

7. The reversing sensor device as claimed in claim 2, wherein the ultrasonic transceiver is a piezoelectric ceramic.

8. The reversing sensor device as claimed in claim 1, wherein the master-sensor is further connected to a display, wherein the display is connected to the microprocessor via the gate circuit to display a distance from the obstacle to a rear of the vehicle.

9. The reversing sensor device as claimed in claim 1, wherein the slave-sensor comprises:

a microprocessor for generating a square wave signal, collecting an A/D conversion result, and communicating with the master-sensor;

an ultrasonic emission circuit being connected to the microprocessor to boost voltage potential of the square wave signal and then driving an ultrasonic transceiver to transmit an ultrasonic wave;

a reflective wave detection circuit being connected to the ultrasonic transceiver and controlled by the microprocessor, wherein when the transmitted ultrasonic wave encounters an obstacle and then is reflected to the ultrasonic transceiver, the reflective wave detection circuit detects and amplifies a reflective signal and then sends the amplified reflective signal to the microprocessor.

10. The reversing sensor device as claimed in claim 9, wherein the slave-sensor further comprises a communication circuit being connected to the microprocessor to make the slave-sensor connected with the master-sensor via a single communication line.

11. The reversing sensor device as claimed in claim 9, wherein the microprocessor comprises a built-in A/D converter.

12. The reversing sensor device as claimed in claim 9, wherein the ultrasonic emission circuit comprises a transistor and a step-up coil, wherein a base of the transistor is connected to a square wave output pin of the microprocessor, so as to step up the square wave signal that is outputted by the microprocessor of the slave-sensor.

13. The reversing sensor device as claimed in claim 9, wherein the reflective wave detection circuit of the slave-sensor comprises a plurality of resistors, a capacitor and an amplifier circuit having a plurality of operation amplifiers, wherein an input terminal of the reflective wave detection circuit is connected to the ultrasonic transceiver and an output terminal of the reflective wave detection circuit is connected to the microprocessor of the slave-sensor.

14. The reversing sensor device as claimed in claim 9, wherein the communication circuit of the slave-sensor comprises two transistors Q1 and Q2, wherein one transistor Q1 is PNP and the other transistor Q2 is NPN, wherein a collector of the transistor Q1 and a base of the transistor Q2 are mutually connected to a communication line, and wherein a base of the transistor Q1 is connected to a TXD pin of the microprocessor, and a collector of the transistor Q2 is connected to a RXD pin of the microprocessor.

15. The reversing sensor device as claimed in claim 9, wherein the ultrasonic transceiver is a piezoelectric ceramic.

* * * * *